(12) United States Patent
Tsuchida

(10) Patent No.: US 8,056,880 B2
(45) Date of Patent: Nov. 15, 2011

(54) ELECTRONIC APPARATUS

(75) Inventor: Shunichi Tsuchida, Fukaya (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 12/856,427

(22) Filed: Aug. 13, 2010

(65) Prior Publication Data

US 2011/0058318 A1    Mar. 10, 2011

(30) Foreign Application Priority Data

Sep. 9, 2009  (JP) ................. 2009-207803

(51) Int. Cl.
*F16F 15/08* (2006.01)

(52) U.S. Cl. ........ 248/638; 248/580; 248/596; 248/609; 248/636; 361/679.4

(58) Field of Classification Search .......... 248/638, 248/580, 581, 589, 596, 609, 636; 361/679.4
See application file for complete search history.

(56) References Cited

U.S. PATENT DOCUMENTS

| | | | | |
|---|---|---|---|---|
| 4,953,259 A | * | 9/1990 | Frye et al. | 16/225 |
| 5,454,745 A | * | 10/1995 | Spielberger | 446/71 |
| 6,018,847 A | * | 2/2000 | Lu | 16/337 |
| 6,644,611 B1 | * | 11/2003 | Tai | 248/292.13 |
| 6,671,927 B2 | * | 1/2004 | Chen | 16/339 |
| 6,918,562 B2 | * | 7/2005 | Lee et al. | 248/130 |
| 7,523,242 B2 | * | 4/2009 | Lee et al. | 710/303 |

FOREIGN PATENT DOCUMENTS

| | | |
|---|---|---|
| JP | U 06-032788 | 4/1994 |
| JP | U H06-032788 A | 4/1994 |
| JP | 07026950 A * | 1/1995 |
| JP | 2006-107661 A | 4/2006 |
| JP | 2006-351117 A | 12/2006 |
| JP | 2007-133990 A | 5/2007 |
| JP | 2009-193632 A | 8/2009 |

OTHER PUBLICATIONS

Notification of Reasons for Refusal mailed by Japan Patent Office on Nov. 2, 2010 in the corresponding Japanese patent application No. 2009-207803.

* cited by examiner

*Primary Examiner* — Anita M King
(74) *Attorney, Agent, or Firm* — Knobbe Martens Olson & Bear LLP

(57) ABSTRACT

An electronic apparatus including: a supported body; a support member provided with a through hole extended in an substantially horizontal direction; a fixture that fixes the supported body and the support member to each other in an approximately horizontal direction through the through hole of the support member; a buffer member that is disposed between the fixture and the support member and has a first portion that is supported by an inner circumferential face of the through hole of the support member and a second portion that is not supported by the inner circumferential face of the through hole of the support member; and a support body that is disposed in the support member so as to support the second portion of the buffer member.

6 Claims, 6 Drawing Sheets

ELECTRONIC APPARATUS

CROSS-REFERENCE TO RELATED APPLICATION(S)

The present application claims priority from Japanese Patent Application No. 2009-207803 filed on Sep. 9, 2009, the entire content of which is incorporated herein by reference.

BACKGROUND

1. Field

One embodiment of the present invention relates to an electronic apparatus that improves the buffering characteristics of a support member.

2. Description of the Related Art

In an electronic apparatus having a device such as a Hard Disk Drive (HDD) for which vibration needs to be considered, there are mutual influences of vibration and shock between the device and a support member that supports the device. Thus, vibration generated from the device is transferred to the entire electronic apparatus through the support member, and the vibration affects other members of the electronic apparatus. In contrast, vibration and shock applied from other components of the electronic apparatus or the outside of the electronic apparatus may propagate to the device through the support member to have a bad influence thereon. The vibration and the shock may cause breakdown, deterioration, noise, and the like of the device or the components of the electronic apparatus.

Accordingly, a vibration-proof device that prevents the propagation of vibration by disposing an elastic body between a supported body and a support body is proposed.

In the anti-vibration device disclosed in JP-UM-A-06-032788, the propagation of vibration is prevented by disposing a rubber elastic body between a supported body and a support body. However, a main unit is supported only on contact portions between the rubber elastic body and the support body. Accordingly, there are many cases where the buffering characteristics for vibration or shock are limited.

BRIEF DESCRIPTION OF THE DRAWINGS

A general configuration that implements the various features of the invention will be described with reference to the drawings. The drawings and the associated descriptions are provided to illustrate embodiments of the invention and not to limit the scope of the invention.

DETAILED DESCRIPTION OF EXEMPLARY EMBODIMENTS

Hereinafter, exemplary embodiments of the present invention will be explained in detail with reference to the drawings. The following exemplary embodiments are examples only and do not limit the scope of the present invention as defined by the claims.

Figure 6:
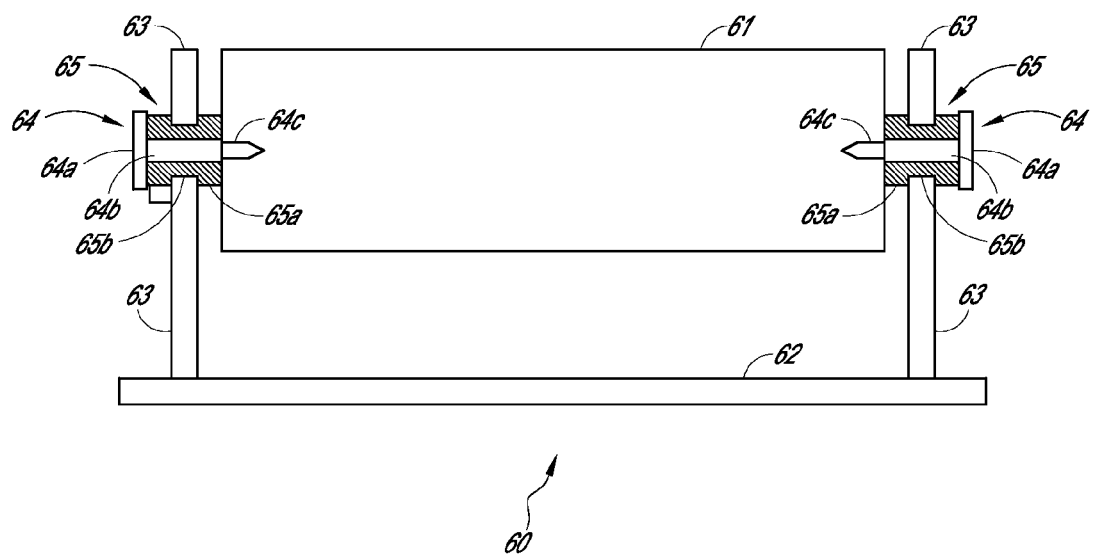
FIG. 6 is a diagram representing an example of a cross-sectional view of a conventional electronic apparatus, viewed in the horizontal direction

First, the aspects of a related-art electronic apparatus 60 will be described with reference to FIG. 6. As shown in FIG. 6, the electronic apparatus 60 includes a storage device 61, a support base portion 62, a support member 63, a stepped screw 64, and an elastic body 65.

The storage device 61 is configured by a storage medium such as a hard disk drive (hereinafter, referred to as an HDD) and a casing that protects the storage medium. In the related-art example and this embodiment, the storage medium that is included in the storage device is described as an HDD as an example. However, the storage medium is not limited thereto and may be a storage medium of a different type. The storage device 61 has a screw hole, into which the stepped screw 64 can screw, on its side face. The storage device 61 is a supported body that is supported by the support member 63.

The support base portion 62 is a member that supports the storage device 61 through the support member 63 and the like from the lower side.

The support member 63 is connected to the support base portion 62 so as to be supported from the lower side. The support member 63 is, for example, a metallic member that supports the storage device 61. Four support members 63 are disposed in the electronic apparatus 60 (although only two support members are shown in FIG. 6, two additional support members, each disposed on the right side and the left side, of the same shape are disposed in the depth direction of the diagram as the storage device 61 interposed between the support members). Thus, the storage device 61 is supported by the support members 63 at four portions. In the support member 63, a through hole is formed, and the support member 63 supports the storage device 61 through the stepped screw 64 passing through the through hole.

The stepped screw 64, for example, is a metallic screw. The stepped screw 64 is a fixture that fixes the support member 63 and the storage device 61 to each other by being screwed into a screw hole disposed in the storage device 61 through the through hole of the support member 63. Here, the stepped screw 64 is not directly brought into contact with the support member 63 and fixes the support member 63 through the elastic body 65. The stepped screw 64 is configured by a flange portion 64a, a core portion 64b, and a male thread portion 64c. The stepped screw 64 screws with the storage device 61 through the male thread portion 64c and is support by the support member 63 in the core portion 64b from the lower side. In addition, the stepped screw 64 has a groove in the flange portion 64a and is fixed, for example, by a driver or the like by using the groove.

The elastic body 65 is made of a material such as rubber that has elasticity. The elastic body 65 is an example of a buffer member that has buffering characteristics for vibration or shock. In the related-art example and this embodiment, the elastic body 65 has a hollow cylinder shape and includes a convex portion 65a and a concave portion 65b on the outer portion thereof. The support member 63 has a top face that is brought into contact with the concave portion 65b for supporting the elastic body 65. In addition, the elastic body 65 is fixed to the support member 63 by the concave portion 65b in the horizontal direction in FIG. 6 and cannot move in the horizontal direction.

The elastic body 65 has characteristics for absorbing vibration and shock, converting the vibration and the shock into heat energy, and diffusing the heat energy. Accordingly, the elastic body 65 absorbs vibration generated from the storage device 61 and decreases vibration propagating to the support member 63. In addition, the elastic body 65 absorbs vibration and shock applied from the outside of the electronic apparatus 60 or vibration generated by other components of the electronic apparatus 60 and decreasing vibration and shock transferred to the storage device 61. The side face of the elastic body 65 facing the storage device 61 side is brought into contact with the storage device 61, and the elastic body 65 also absorbs vibration and shock applied in the horizontal direction in FIG. 6. In the related-art example and this embodiment, as an example of the storage device 61, an HDD is described. In the HDD, a disk disposed on the inside thereof rotates around a vertically aligned axis in FIG. 6, and there are cases where the rotation axis does not coincide with the vertical axis passing through the center of gravity of the storage device 61. Accordingly, the storage device 61 has eccentricity during rotation of the disk, and thus vibration is generated in the horizontal direction in FIG. 6. By bringing the elastic body 65 into contact with the storage device 61 in the horizontal direction in FIG. 6, the horizontal vibration of the storage device 61 and propagation of the vibration to the support member 63 are decreased.

As described above, in order to decrease the vibration of the storage device 61, which is generated in the horizontal direction in FIG. 6, the electronic apparatus 60 is configured such that the storage device 61 is supported by the support member 63 in the horizontal direction. Then, by forming the convex portion 65a and the concave portion 65b in the elastic body 65 and fitting the concave portion 65b with the support member 63, the storage device 61 is fixed to the support member 63 in the horizontal direction. In addition, by disposing the convex portion 65a between the storage device 61 and the support member 63, propagation of vibration and shock in the horizontal direction (approximately horizontal direction) in the figure between the storage device 61 and the support member 63 is decreased.

However, in a case where the concave portion 65b is configured as described above, in the electronic apparatus 60, only the concave portion 65b in which the cross-sectional area of the elastic body 65 is small (a distance between the support member 63 and the stepped screw 64 is configured to be the shortest) is supported by the support member 63 from the lower side. Thus, for example, in a case where great shock is applied to the electronic apparatus 60 in the vertical direction in FIG. 6, there is a possibility that the concave portion 65b, in which the thickness of the elastic body 65 is small, is fractured due to an excessive force applied from the support member 63 corresponding to the shock. When the concave portion 65b of the elastic body 65 is fractured, the support member 63 and the stepped screw 64 are directly brought into contact with each other. Accordingly, a mechanism that absorbs vibration and shock between the storage device 61 and the support member 63 does not exist, whereby the vibration and the shock directly propagate.

First Embodiment

A first embodiment will be described with reference to FIGS. 1 to 3.

Figure 1:
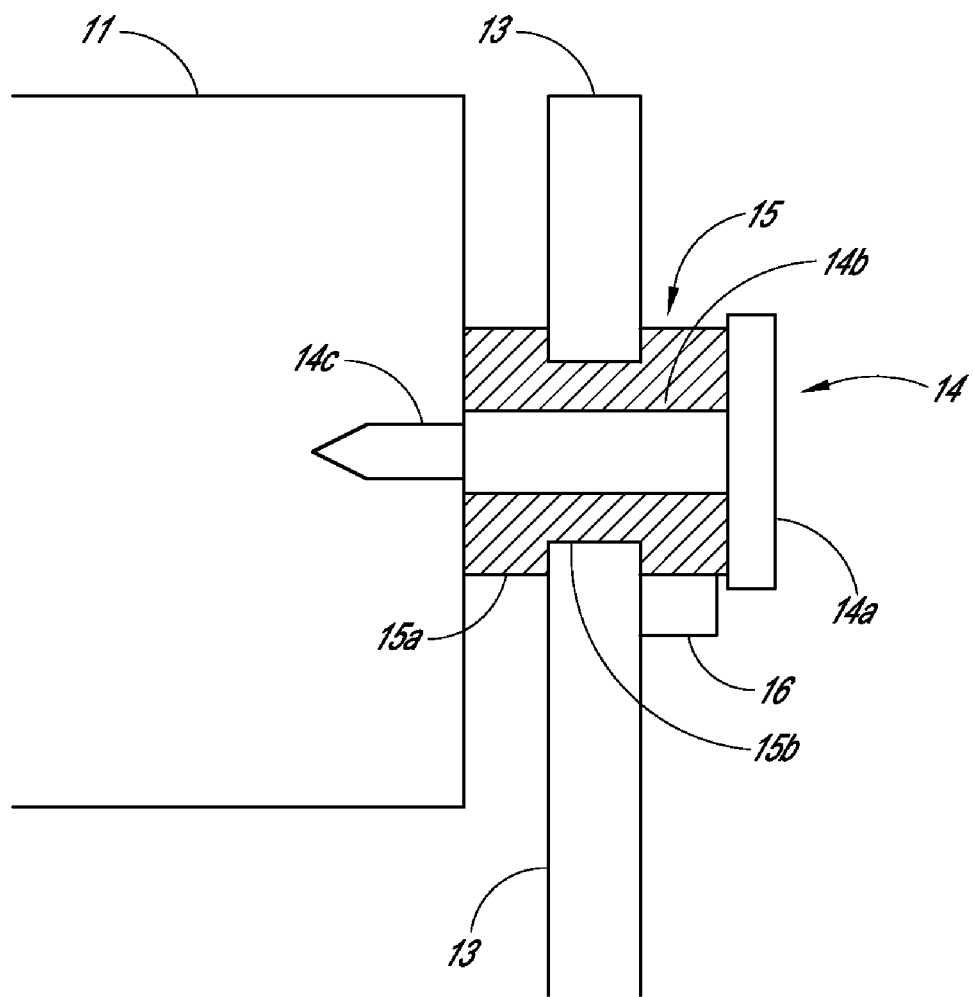
FIG. 1 is a diagram showing an example of fixing portions between a storage device and a support member according to a first embodiment.
Figure 2:
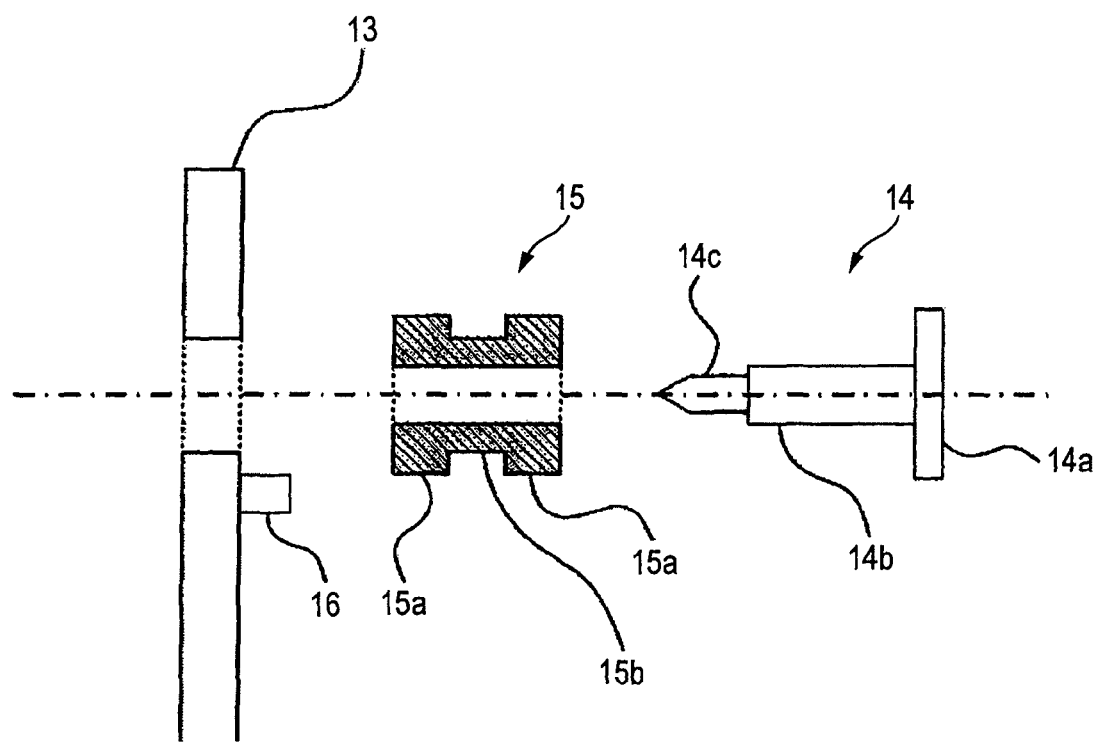
FIG. 2 is an exploded view showing an example of fixing portions between a storage device and a support member according to the first embodiment.

FIG. 1 is a diagram showing an example of fixing portions between a storage device 11 and a support member 13 of an electronic apparatus 10 according to this embodiment. FIG. 2 is an exploded view showing an example of fixing portions between the storage device 11 and the support member 13 of the electronic apparatus 10 according to this embodiment. In FIGS. 1 and 2, the electronic apparatus 10, the storage device 11, the support member 13, a stepped screw 14, an elastic body 15, and a protrusion 16 are shown. In the description made with reference to FIGS. 1 and 2, description of the portions that corresponds to the configuration shown in FIG. 6 is omitted.

The electronic apparatus 10 has the storage device 11, a support base portion (located in a same position as that of the support base portion 62 shown in FIG. 6; not shown in this embodiment), the support member 13, the stepped screw 14, the elastic body 15, and the protrusion 16.

The stepped screw 14, for example, is a metallic screw. The stepped screw 14 is a fixture that fixes the support member 13 and the storage device 11 to each other by being screwed into a screw hole disposed in the storage device 11 through the through hole of the support member 13. Here, the stepped screw 14 is not directly brought into contact with the support member 13 and fixes the support member 13 through the elastic body 15. The stepped screw 14 is configured by a flange portion 14a, a core portion 14b, and a male thread portion 14c. The stepped screw 14 screws with the storage device 11 through the male thread portion 14c and is support by the support member 13 in the core portion 14b from the lower side. In addition, the stepped screw 14 has a groove in the flange portion 14a and is fixed, for example, by a driver or the like by the groove.

The elastic body 15 is made of a material such as rubber that has elasticity. The elastic body 15 is an example of a buffer member that has buffering characteristics for vibration or shock. In the related-art example and this embodiment, the elastic body 15 has a hollow cylinder shape and includes a convex portion 15a and a concave portion 15b on the outer portion thereof. The support member 13 has a top face that is brought into contact with the concave portion 15b for supporting the elastic body 15. In addition, the elastic body 15 is fixed to the support member 13 by the concave portion 15b in the horizontal direction in FIG. 1 and cannot move in the horizontal direction.

In this embodiment, the protrusion 16 serving as a support body is disposed on a side face of the support member 13 of the electronic apparatus 10. This protrusion 16 is disposed in a portion on the side face of the support member 13, the portion which is brought into contact with the convex portion 15a of the elastic body 15. The protrusion 16 supports the convex portion 15a of the elastic body 15 from the lower side. By disposing the protrusion 16 in the support member 13 and supporting the convex portion 15a of the elastic body 15 from the lower side as described above, an area supporting the elastic body 15 is increased, stress on a support face is decreased, and a volume for absorbing vibration and shock of the elastic body 15 is increased. Accordingly, it is difficult for mutual vibration and shock to propagate between the storage device 11 and the support member 13, and therefore the influence of the vibration and the shock decreases. As a result, the buffering characteristics are improved.

In this embodiment, as shown in FIG. 1, the protrusion 16 is exemplified to be disposed on a side face of the support member 13 that is located on the side on which the storage device 11 is not located. However, this embodiment is not limited thereto. Thus, in contrast, the protrusion 16 may be disposed on a side face of the support member 13, the side face which faces the storage device 11 is located. However, in such a case, when the protrusion 16 is directly brought into contact with the storage device 11, vibration propagates to the support member 13 not through the elastic body 15 but through the protrusion 16 having low capability for absorbing vibration and shock. Accordingly, the size of the protrusion 16 needs to be adjusted not to be brought into contact with the storage device 11.

According to this embodiment, the elastic body 15 has an increased area for receiving a force (shock) applied from the support member 13, and accordingly, the received stress decreases, whereby the fatigue life of the elastic body 15 is increased.

In addition, according to the electronic apparatus 10 of this embodiment, propagation of vibration generated by the storage device 11 to other components can be decreased. Thus, a noise (for example, a noise generated by a contact between components due to the vibration) generated by other components, which is caused by the vibration, can be decreased.

Figure 3:
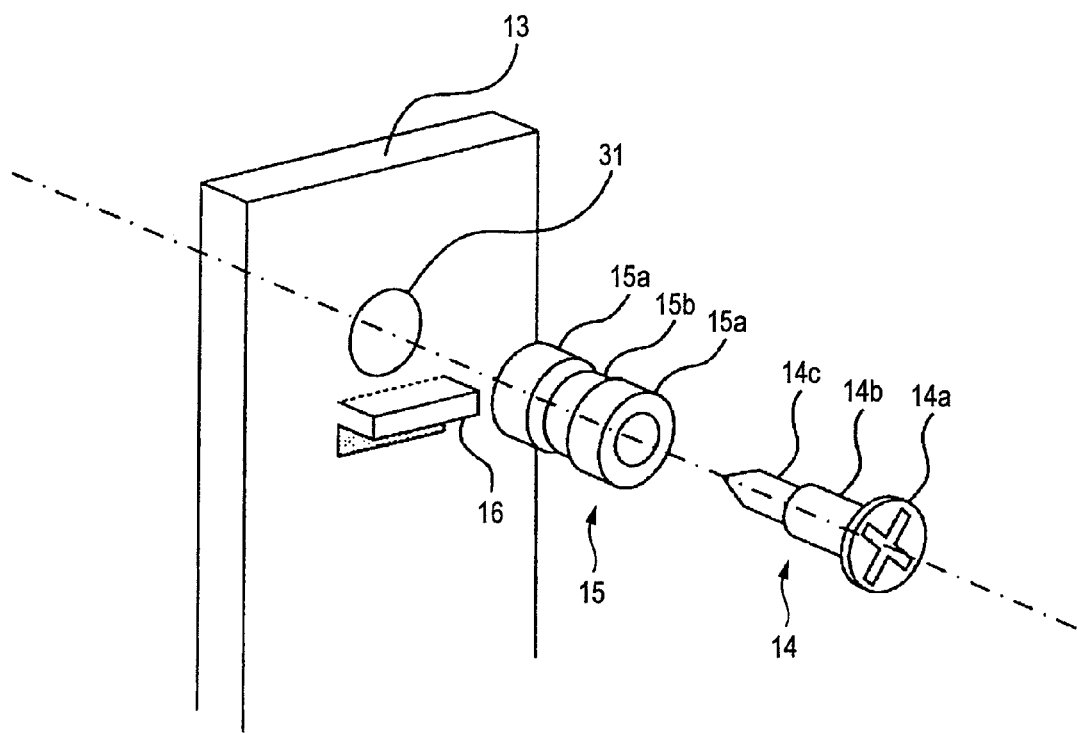
FIG. 3 is an exploded perspective view showing an example of fixing portions between a storage device and a support member according to the first embodiment.

FIG. 3 is an exploded perspective view showing an example of fixing portions between the storage device 11 and the support member 13 of the electronic apparatus 10 according to this embodiment.

In this embodiment, the protrusion 16 has a rectangular parallelepiped shape. The protrusion 16 of this embodiment, for example, is formed by inserting a cut having the shape of "U" below a through hole 31 of the support member 13 with its upper side being connected to the support member 13 and bending the portion in which the cut is inserted like the protrusion 16. This protrusion 16 is disposed in such a position that the convex portion 15a of the elastic body 15 is brought into contact with the top face of the protrusion 16 in a case where the elastic body 15 is installed to the through hole 31.

In this embodiment, by bending a part of the support member 13 as described above, the protrusion 16 can be formed, whereby the workability is excellent. In addition, since the convex portion 15a of the elastic body 15 that already exists can be used for the support, the manufacturing costs can be reduced.

First Modified Example

A first modified embodiment of the present invention will be described with reference to FIG. 4.

Figure 4:
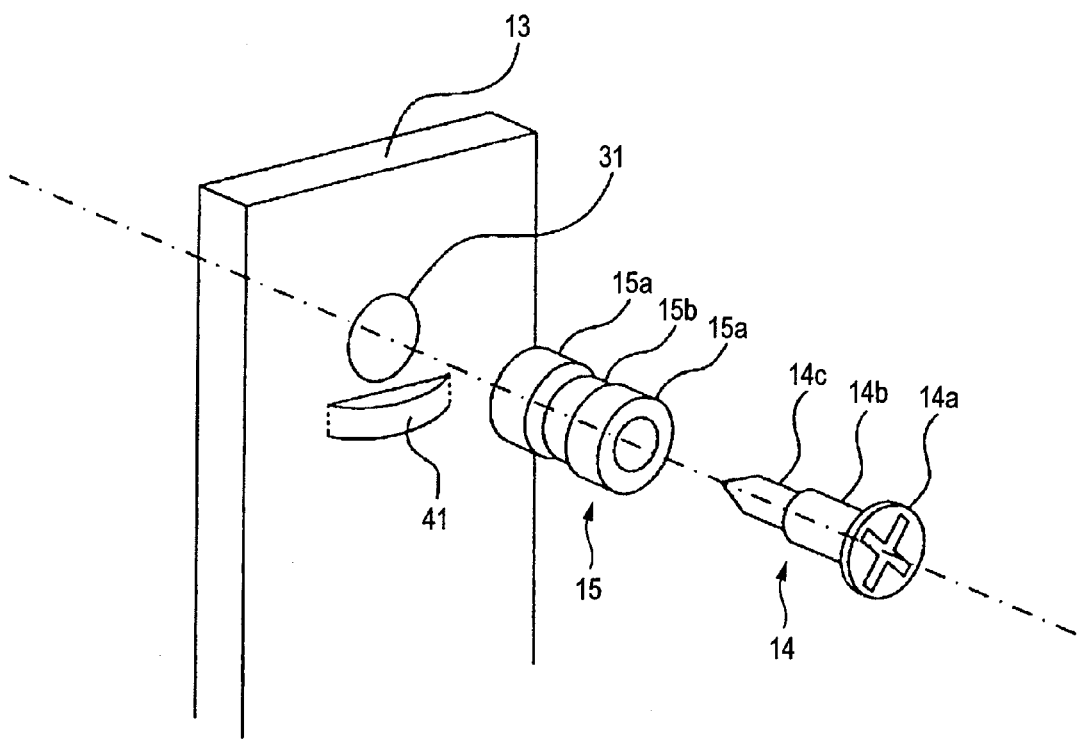
FIG. 4 is an exploded perspective view showing an example of fixing portions between a storage device and a support member according to a first modified example.

FIG. 4 is a diagram showing an example of fixing portions between a storage device 11 and a support member 13 of an electronic apparatus 10 according to this modified example.

In this modified example, features that are different from the first embodiment are the method of forming a protrusion 41 and the shape of the protrusion 41.

The method of forming the protrusion 41 in this modified example will now be described. First, two cuts formed in the horizontal direction are inserted below a through hole 31 of the support member 13. Then, a force is applied to a portion interposed between the two cuts in the direction vertical to the face of the support member 13 so as to transform the portion interposed between the cuts to protrude, whereby the protrusion 41 is formed. The transformed portion is plastic-deformed, and accordingly, the portion cannot return to its original shape.

Here, the position on the side face of the support member 13 in which the protrusion 41 is disposed is a position in which the top face of the protrusion 41 is brought into contact with the convex portion 15a of the elastic body 15 that is installed to the support member 13.

According to this modified example, by configuring the protrusion 41 by transforming the support member 13 as described above, propagation of vibration and shock in the electronic apparatus 10 can be decreased without adding another member to the conventional electronic apparatus 60.

Second Modified Example

A second modified example of the present invention will be described with reference to FIG. 5.

Figure 5:
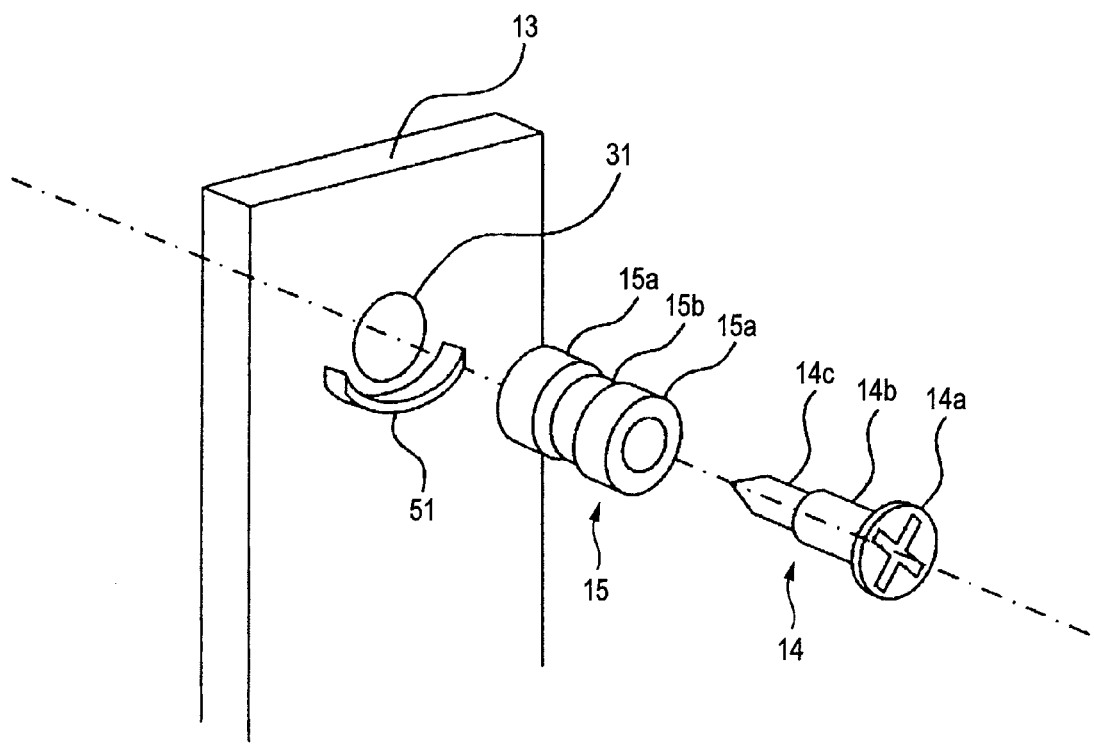
FIG. 5 is an exploded perspective view showing an example of fixing portions between a storage device and a support member according to a second modified example.

FIG. 5 is a diagram showing an example of fixing portions between a storage device 11 and a support member 13 of an electronic apparatus 10 according to this modified example.

In this modified example, features that are different from the first embodiment and the first modified example are the method of forming a protrusion 51 and the shape of the protrusion 51.

The protrusion 51 of this modified example, unlike in the first embodiment and the first modified example, is exemplified not to be formed by transforming the support member 13 but to be formed by configuring the protrusion 51 by using a member other than the support member 13 and fixing the member to the support member 13. As a method of fixing the protrusion 51 to the support member 13, various fixing methods such as fixing by using an adhesive agent, physical fixing including screw fixing or the like, or the like can be considered. However, this modified example is not limited thereto, and the support member 13 and the protrusion 51 may be integrally formed as a same member.

Here, the position on the side face of the support member 13 in which the protrusion 51 is disposed is a position in which the top face of the protrusion 51 is brought into contact with the convex portion 15a of the elastic body 15 that is installed to the support member 13.

In this modified example, the protrusion 51 can be formed on both the side of the support member 13 which faces the storage device 11 and the rear face thereof. Accordingly, the number of support portions that are brought into contact with the elastic body 15 is further increased, and the contact area of the protrusion 51 and the elastic body 15 is further increased, compared to a case where the protrusion is disposed only on one side. Therefore, the propagation of vibration and shock can be further decreased.

In a case where the protrusions 51 are disposed on both sides of the support member 13 in this modified example, even when an excessive weight is added to the elastic body 15 due to strong shock applied to the electronic apparatus 10 and the concave portion 15b of the elastic body 15 is fractured, the elastic body 15 is supported from the lower side by the protrusions 51 disposed on both sides of the support member 13 in the convex portion 15a as long as the convex portion 15a is not fractured. Therefore, according to the electronic apparatus 10 of this modified example, the propagation of vibration and shock can be decreased even in a case where the concave portion 15b of the elastic body 15 is fractured.

In addition, in this embodiment, a state in which the support member 13 and the concave portion 15b of the elastic body 15 are brought into contact with each other is exemplified in the above description. However, the present invention is not limited thereto. Thus, the electronic apparatus 10 may be configured such that the support member 13 and the concave portion 15b of the elastic body 15 are not brought into contact with each other. In such a case, the concave portion 15b of the elastic body 15 is not brought into contact with the support member 13, and only the convex portion 15a is brought into contact with the support body 16. Accordingly, the elastic body 15 is supported by the support body 16 only in the convex portion 15a. When configured as described above, vibration and shock are absorbed by the convex portion 15a of the elastic body 15 that has a width greater than that of the concave portion 15b. Accordingly, compared to a case where vibration and shock are responded to only by using the concave portion 15b that has a small width as in the conventional configuration, the propagation of vibration and shock can be decreased further.

In addition, in this embodiment, the elastic body 15 is exemplified to have the convex portion 15a and the concave portion 15b. However, the present invention is not limited thereto. Thus, the outer surface of the elastic body 15 may be formed to be flat. Even in a case where the outer surface is formed to be flat, a buffering area is increased by disposing the protrusion. Accordingly, the buffering characteristics between the storage device of the electronic apparatus and the support member are improved.

In the electronic apparatus according to an embodiment of the present invention, by increasing the portion for absorbing vibration or shock of the elastic body, the buffering characteristics between electronic apparatuses in which a storage device and a storage device are mounted can be improved.

While the present invention has been shown and described with reference to certain exemplary embodiments thereof, it will be understood by those skilled in the art that various changes modifications may be made therein without departing from the spirit and scope of the present invention as defined by the appended claims.

What is claimed is:

1. An electronic apparatus comprising:
   a supported body;
   a support member comprising a through hole in an approximately horizontal direction;
   a fixture configured to fix the supported body and the support member to each other in the approximately horizontal direction through the through hole of the support member;
   a buffer member that is disposed between the fixture and the support member, comprising a first portion that is supported by an inner circumferential face of the through hole of the support member and a second portion that is not supported by the inner circumferential face of the through hole of the support member; and
   a support body that is disposed to protrude in the approximately horizontal direction from a side of the support member, and configured to support a lower side of the second portion of the buffer member.

2. The electronic apparatus of claim 1, wherein the support body is formed by transforming a part of the support member.

3. The electronic apparatus of claim 1, wherein the support body is provided on both sides of a face of the support member on which the through hole is open.

4. The electronic apparatus of claim 3, wherein the buffer member is configured to have, in a radial direction of the through hole, a thickness of a portion which is sandwiched between the support body and the fixture to be larger than a thickness of a portion which is sandwiched between the support member and the fixture.

5. An electronic apparatus comprising:
   a supported body;
   a support member comprising a through hole in an approximately horizontal direction;
   a fixture configured to fix the supported body and the support member to each other in an approximately horizontal direction through the through hole of the support member;
   a buffer member that is disposed between the fixture and the support member, comprising a first portion that is located inside the through hole of the support member and a second portion that is not located inside the through hole of the support member; and
   a support body that is disposed to protrude in the approximately horizontal direction from a side of the support member, configured to support a lower side of the second portion of the buffer member,
   wherein the first portion of the buffer member is not supported by the support member.

6. The electronic apparatus of claim 1, wherein the fixture is a shoulder bolt.

* * * * *